United States Patent
Wu

(10) Patent No.: US 8,553,187 B2
(45) Date of Patent: Oct. 8, 2013

(54) PATTERNED RETARDER FILM AND METHOD FOR MANUFACTURING THE SAME

(75) Inventor: Fung-Hsu Wu, Gueishan Township, Taoyuan County (TW)

(73) Assignee: BenQ Materials Corp., Taoyuan County (TW)

( * ) Notice: Subject to any disclaimer, the term of this patent is extended or adjusted under 35 U.S.C. 154(b) by 513 days.

(21) Appl. No.: 12/972,997

(22) Filed: Dec. 20, 2010

(65) Prior Publication Data

US 2011/0292328 A1    Dec. 1, 2011

Related U.S. Application Data

(60) Provisional application No. 61/348,768, filed on May 27, 2010, provisional application No. 61/367,033, filed on Jul. 23, 2010.

(51) Int. Cl.
*G02F 1/1335* (2006.01)

(52) U.S. Cl.
USPC .......................... 349/117; 349/119; 349/121

(58) Field of Classification Search
USPC ....................... 349/117, 118, 119, 120, 121
See application file for complete search history.

(56) References Cited

U.S. PATENT DOCUMENTS

| | | |
|---|---|---|
| 2,631,496 A | 3/1953 | Rehorn |
| 2,647,440 A | 8/1953 | Rehorn |
| 5,692,226 A | 11/1997 | Hall |
| 6,002,518 A | 12/1999 | Faris |
| 6,046,787 A | 4/2000 | Nishiguchi |
| 6,192,226 B1 | 2/2001 | Fang |
| 6,195,205 B1 | 2/2001 | Faris |
| 6,498,679 B2 | 12/2002 | Lee et al. |
| 6,624,863 B1 | 9/2003 | Jacobs et al. |
| 6,963,356 B2 | 11/2005 | Satoh |
| 7,050,233 B2 | 5/2006 | Nikolov et al. |
| 7,414,782 B2 | 8/2008 | Jung |
| 7,440,044 B2 | 10/2008 | Peterson et al. |
| 7,580,085 B2 | 8/2009 | Jacobs et al. |

(Continued)

OTHER PUBLICATIONS

Non-Final Office Action mailed Mar. 1, 2013 for U.S. Appl. No. 12/973,087, filed Dec. 20, 2010.

(Continued)

*Primary Examiner* — Edward Glick
*Assistant Examiner* — David Chung
(74) *Attorney, Agent, or Firm* — McClure, Qualey & Rodack, LLP

(57) ABSTRACT

A patterned retarder film with a plurality of first retardation regions and a plurality of second retardation regions and a method for manufacturing the same are provided. The method includes providing a base film; forming an alignment layer on a first surface of the base film; coating a liquid crystal material on the alignment layer as a liquid crystal layer; aligning the liquid crystal layer with the alignment layer; embossing the liquid crystal layer with a predetermined pattern to form a patterned layer with a plurality of first and second retardation regions. The structure of the first and second retardation regions are grating-like stripe structure and parallel to each other and the structure of the second retardation regions are grooving-like stripe structure and interleaved with each other. The patterned liquid crystal layer is cured. The phase retardation of the first and second retardation regions is different by 180°.

20 Claims, 3 Drawing Sheets

(56) References Cited

U.S. PATENT DOCUMENTS

| | | |
|---|---|---|
| 7,623,111 B2 | 11/2009 | Ioki et al. |
| 7,969,541 B2 | 6/2011 | Okuyama et al. |
| 2010/0149472 A1 | 6/2010 | Hoshi |
| 2011/0292329 A1* | 12/2011 | Huang et al. ............ 349/117 |
| 2011/0292330 A1* | 12/2011 | Huang et al. ............ 349/117 |

OTHER PUBLICATIONS

Non-Final Office Action mailed Mar. 1, 2013 for U.S. Appl. No. 12/973,045, filed Dec. 20, 2010.

English Abstract translation of JP2010210939 (Published Sep. 24, 2010).

* cited by examiner

PATTERNED RETARDER FILM AND METHOD FOR MANUFACTURING THE SAME

This application claims the benefit of U.S. provisional application Ser. No. 61/348,768, filed May 27, 2010, and U.S. provisional application Ser. No. 61/367,033, filed Jul. 23, 2010, the subject matters of which are incorporated herein by reference.

BACKGROUND OF THE INVENTION

1. Field of the Invention

The invention relates in general to a patterned retarder film and a method for manufacturing the same, and more particularly to a patterned retarder film and an embossing method for manufacturing the same.

2. Description of the Related Art

It is known that applying a patterned retarder to a liquid crystal display screen, a three-dimensional stereo imaging can thus be provided for audience wearing a pair of polarization glasses. Several approaches are disclosed to manufacture a patterned retarder.

Some methods for manufacturing patterned retarder film are provided in the related art, such as a method of making a patterned retarder disclosed in U.S. Pat. No. 6,624,863 discloses; a micro-retarder plate using a single plate with phase retardation disclosed in U.S. Pat. No. 6,498,679 describes.

The present invention intends to provide a novel method for manufacturing patterned retarders with an embossing treatment.

SUMMARY OF THE INVENTION

The invention is to provide a patterned retarder film and a method for manufacturing the same and especially a patterned retarder film and an embossing method for manufacturing the same.

According to an aspect of the present invention, a method for manufacturing a patterned retarder film with a micro-structure is provided. The method for manufacturing a patterned retarder film with a plurality of first retardation regions and a plurality of second retardation regions comprises the following steps. A base film is provided. An alignment layer is formed on a first surface of the base film. A polymerizable liquid crystal material is coated on the alignment layer to form a liquid crystal layer. The liquid crystal layer is aligned with the alignment layer. The liquid crystal layer is embossed with a predetermined pattern to form a plurality of first retardation regions and the second retardation regions, wherein the structures of the first retardation regions and the second retardation regions are grating-like stripe structures and parallel to each other and the structure of the second retardation regions relative to that of the first retardation regions are grooving-like stripe structures and interleaved with each other. The aligned liquid crystal layer is then cured, wherein the phase retardation of the first retardation regions and that of the second retardation regions are different by 180°.

According to a further aspect of the present invention, a patterned retarder film with a plurality of first retardation regions and a plurality of second retardation regions is provided. The patterned retarder film comprises a base film; an alignment layer formed on a first surface of the base film; a liquid crystal layer coated on and aligned with the alignment layer; and a plurality of first retardation regions and a plurality of second retardation regions embossed on the liquid crystal layer with a predetermined pattern, wherein the structures of the first retardation regions and the second retardation regions are grating-like stripe structures and parallel to each other and the structures of the second retardation regions relative to that of the first retardation regions are grooving-like stripe structures and interleaved with each other; wherein the phase retardation of the first retardation region and that of the second retardation regions is different by 180°.

In another aspect of the patterned retarder film with a micro-structure manufactured by an embodiment of the method of present invention, the patterned retarder film is adhered to at least one functional optical film such as, for example, polarizing film, hard-coating film, low reflective film, anti-reflective film and anti-glaring film.

In further another aspect of the patterned retarder film with a micro-structure manufactured by the method of the present invention, the patterned retarder film is adhered to a display panel to provide a 3-dimensional stereo image to the viewers.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
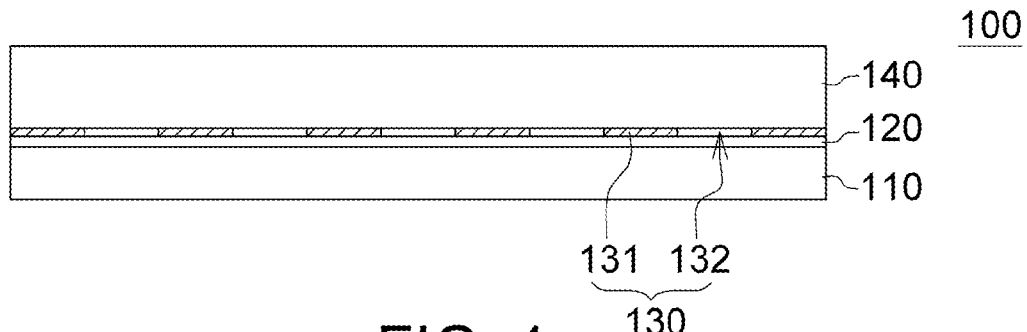
FIG. 1 is a cross-sectional view of a patterned retarder film of an embodiment of the present invention.

A patterned retarder film 100 manufactured by the method of an embodiment of the present invention is shown in FIG. 1. The patterned retarder film 100 includes a base film 110, an alignment layer 120, a patterned liquid crystal layer 130 comprising a plurality of first retardation regions 131 and a plurality of second retardation regions 132. A release film 140 is adhered to the cured liquid crystal layer 130, which can be removed while a functional optical film, such as a polarizer film, is adhered on the liquid crystal layer 130.

Figure 2:
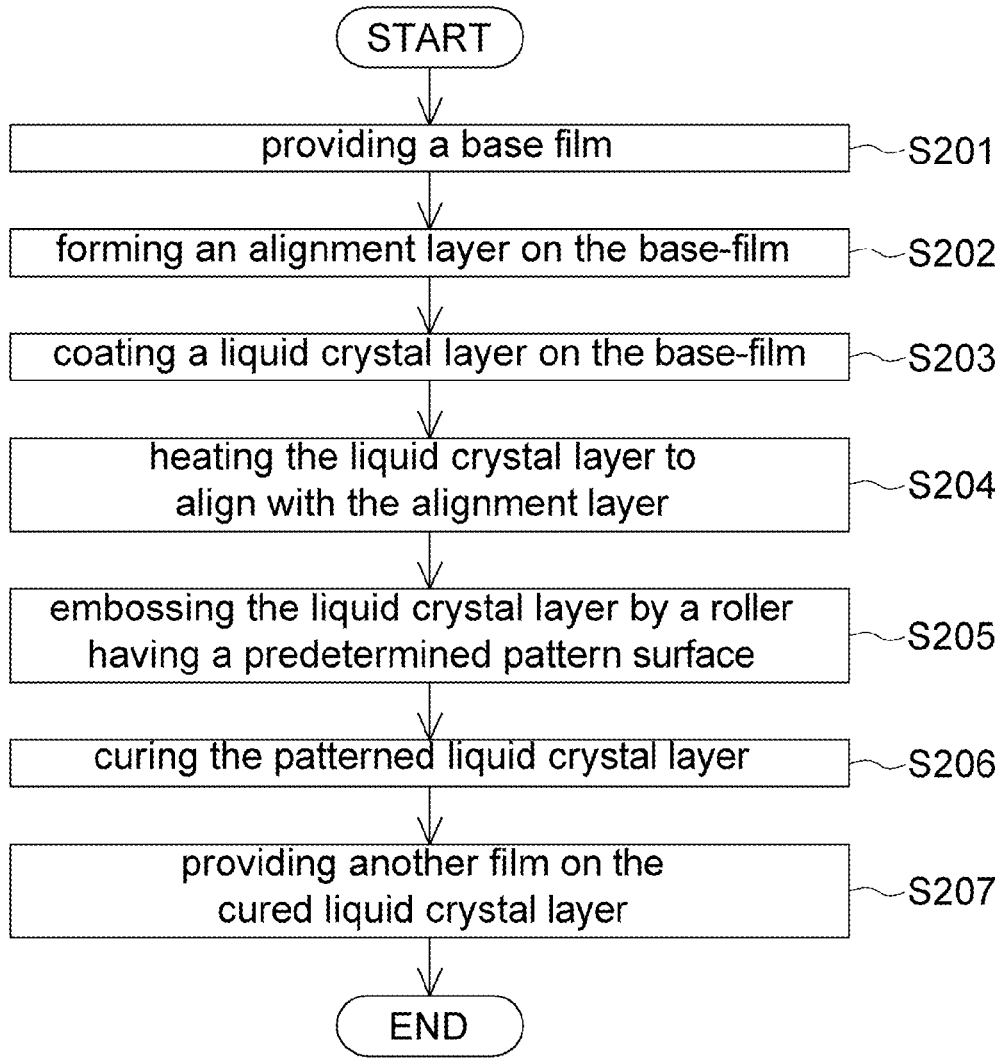
FIG. 2 is a flow chart of a method for manufacturing a patterned retarder film of an embodiment of the present invention.

A preferred embodiment of the method of the present invention is illustrated by FIG. 2 together with FIGS. 3A to 3D. FIG. 2 is a flow chart of a method for manufacturing a patterned retarder film of an embodiment of the present invention. FIGS. 3A to 3D illustrate the steps in a method for manufacturing a patterned retarder film of an embodiment of the present invention. In step S201, a base film 210 is provided. The phase retardation of the base film 210 is less than 90° and preferably is substantial less than 0°. The base film 210 can be a poly(ethylene terephthalate) (PET), polycarbonate (PC), triacetyl cellulose (TAC), poly(methyl methacrylate) (PMMA) or cyclo-olefin polymer (COP). The thickness of the base film 210 is in the range of 30 microns to 300 microns.

In step S202, an alignment layer 220 is formed on the base film 210. The alignment layer 220 is formed on the base film 210 by a processes known to an artisan skilled in the art, such as, for example, micro-scratch alignment treatment, rubbing treatment, photo-alignment, $SiO_2$ evaporation and ion-beam alignment.

Figure 3A:
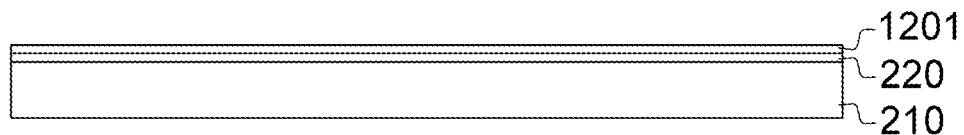
FIGS. 3A to 3D illustrate the steps in a method for manufacturing a patterned retarder film of an embodiment of the present invention.

In step S203, after the alignment layer 220 is formed, a liquid crystal material 1201 was coated on the alignment layer 220 as shown in FIG. 3A. The liquid crystal materials 1201 used in the present invention is a polymerizable liquid crystal. In one embodiment of the method of the present invention, the liquid crystal material is BASF LC242 (photopolymerizable liquid crystal diacrylate, available from BASF Co., Germany.) In another embodiment of the method of the present, the liquid crystal material is RMS 10-021 (available from Merck Diplay Tech Ltd, Taiwan.) The liquid crystal was mixed in a solvent for conveniently coating on the alignment layer 220. The solid content of the liquid crystal solution is in the range from 10% to 50%. In a preferred embodiment of the method of the present invention, the solid content of the liquid crystal solution in the solvent is about 20%. The solvent used in the method of the present invention is known to an artisan skilled in the relevant art, such as, for example, propylene glycol monomethyl ether acetate (PGMEA). The solvents used in the liquid crystal solution were removed before embossing the predetermined pattern on the liquid crystal layer 230 (shown in FIG. 3D).

In step S204 of FIG. 2, the coated liquid crystal material 1201 is conducting a heating treatment to remove the solvent and simultaneously align the liquid crystal with the alignment layer 220. The heating treatment is conducted at a temperature in the range between about 20° C. to about 100° C., preferably from about 50° C. to about 100° C. In a preferred embodiment of the method of the present invention, the temperature of the heat treatment is at 70° C. The temperature of the heating treatment was controlled in order to effect the alignment of the liquid crystal material 1201 to the alignment layer 220. The thickness of the liquid crystal material 1201 after heating treatment is in the range of 0.1 microns to 9.9 microns, which depends on the properties of the polymerizable liquid crystal materials 1201 used, such as the phase retardation thereof provided. The thickness of the liquid crystal material 1201 is preferably in the range of 1 micron to 3 microns. In the embodiment of the method of the present invention using BASF LC242 as the polymerizable liquid crystal material 1201, the thickness of the coated liquid crystal material 1201 is 1.78 microns. In another embodiment of the method of the present invention using Merck RMS10-021 as the polymerizable liquid crystal material 1201, the thickness of the coated liquid crystal material 1201 is 2.1 microns.

Figure 3B:
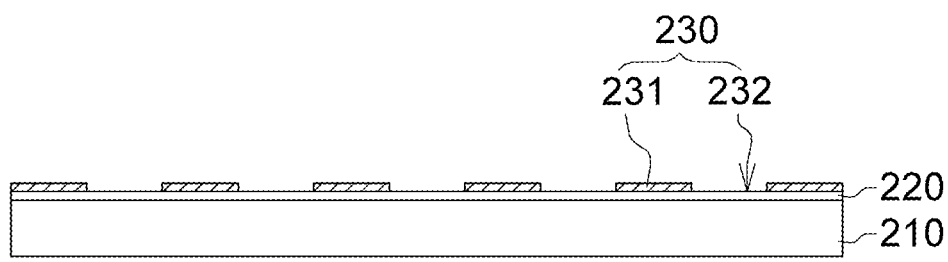
Figure 3C:
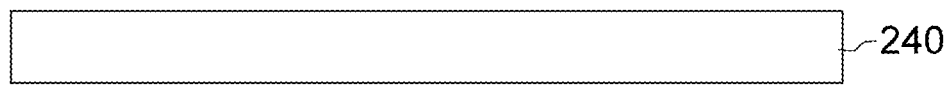
Figure 3D:
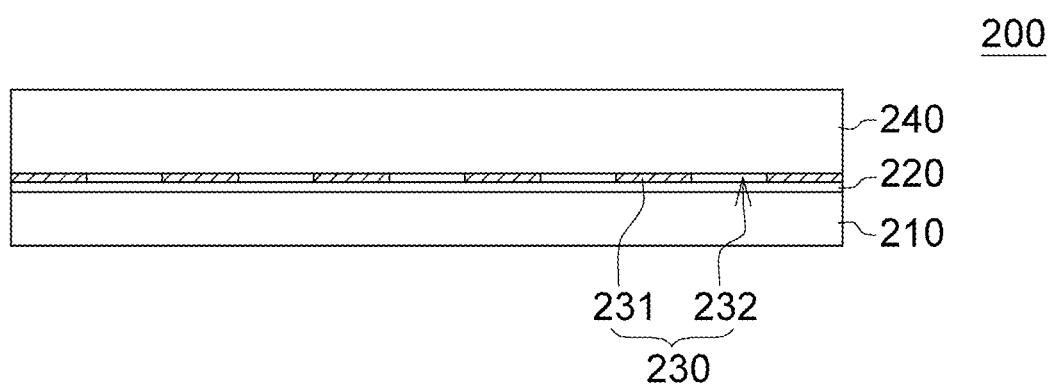
Figure 4:
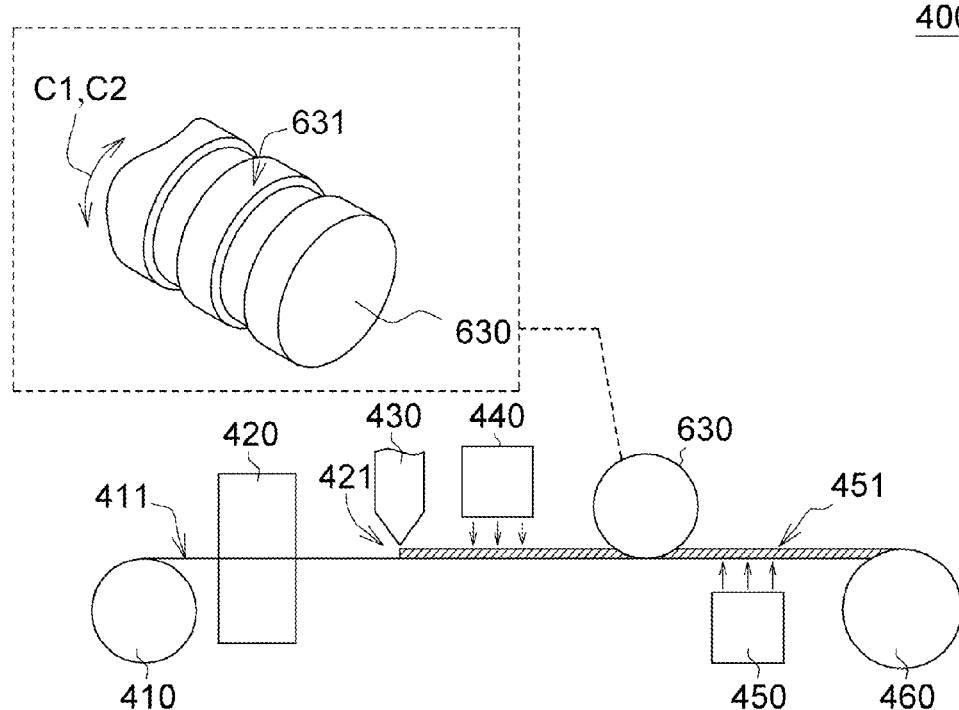
FIG. 4 is a diagrammatic view of a system used for manufacturing a patterned retarder film of an embodiment of the present invention.

After the heating treatment in step S204, the liquid crystal material 1201 is conducted an embossing treatment S204. In step S205, the liquid crystal material 1201 is embossed to a liquid crystal layer 230 having a predetermined pattern comprising a plurality of first retardation regions (i.e. the relief structure 231) and a plurality of second retardation regions (i.e. the groove structure 232) as shown in FIG. 3B. The embossing treatment is effected by a stamp or a roller having a predetermined pattern on the surface thereof. In an embodiment of the method of the present invention, the embossing treatment is effected by such as a grooved roller 630 as shown in FIG. 4. The surface of the roller 630 is molded with a set of relief structures 631 which are grating-like stripe structures and parallel to each other. The set of relief structures 631 is extended along the rotating direction of the roller 630. In another embodiment of the method of the present invention, the set of the relief structures is arranged in a direction perpendicular to the rotating direction of the roller (not shown in Drawings).

When conducting the embossing treatment S205, the liquid crystal layer 230 is passed through the grooved roller 630 to form a set of groove structures 232 and a set of relief structures 231. The structures of the relief structures 231 and the groove structures 232 are grating-like stripe structures and parallel to each other and interleaved with each other. The phase retardation of the relief structures 231 and the phase retardation of the groove structures 232 are different by 180°.

The height of the relief structures 231 is in the range of 0.1 microns to 9.9 microns and preferably is in the range of 1 micron to 3 microns. Since the height of the relief structures 231 depends on the properties of the polymerizable liquid crystal used, such as the phase retardation thereof provided, the height of the relief structure 231 is determined in order for the phase retardation difference between the grooves 232 and the relief structures 231 to be 180°. In the embodiment of the method of the present invention using BASF LC242 as the liquid crystal material, the thickness of the coated liquid crystal layer is 1.78 microns. In another embodiment of the method of the present invention using Merck RMS10-021 as the polymerizable liquid crystal material 1201, the thickness of the coated liquid crystal material 1201 is 2.1 microns. Furthermore, the pitch between two relief structures 231 is determined by the size and the resolution of the display which the present patterned retarder film is adhered to, and viewing distance thereof. Typically, the pitch between two relief structures 231 is selected from a range between 10 microns to 900 microns. For example, for a 24-inch LC display monitor, the pitch between two relief structures 231 is about 250 microns.

In step S205, the patterned liquid crystal layer 230 is conducting a curing treatment. The curing treatment is conducted by a process known to skilled in the art, such as, for example by UV curing treatment or by thermal curing treatment.

After the patterned liquid crystal layer 230 was cured, another film was adhered to the liquid crystal layer 230, as shown in step S207. In one embodiment of the present invention, the film adhered on the liquid crystal layer 230 is a release film 240 which can be removed when the present patterned retarder film is adhered to a display panel or an optical film such as polarizing film. In another preferred embodiment of the method of the present invention, the second film is a polarizing film directed adhered on the patterned liquid crystal layer 230.

Figure 5:
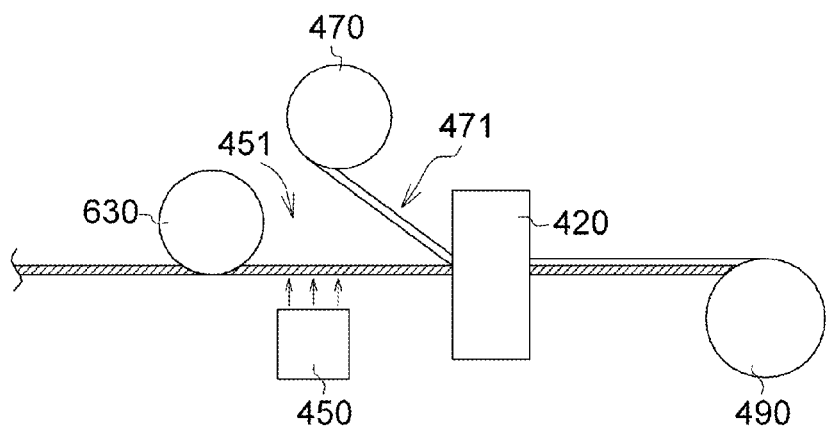
FIG. 5 is a diagrammatic view of a system used for manufacturing a patterned retarder film of another embodiment of the present invention

The present method for manufacturing a patterned retarder film can be conducted in a batch production or a continuous production. FIG. 4 is a diagrammatic view of a system used for manufacturing a patterned retarder film of an embodiment of the present invention in a continuous production, such as, for example, a roll-to-roll system. The system 400 is for manufacturing the present patterned retarder film. The base film 411 is unwound from a first roller 410 and conveyed to pass through an alignment means 420 to form an alignment layer thereon (not shown). A layer of polymerizable liquid crystal 421 is coated on the alignment layer via a coating means 430. The liquid crystal coating 421 is heated at a temperature in a range of about 20° C. to 100° C., preferably in a range of 50° C. to 100° C. and more preferably at 70° C., under a heating means 440 to remove the solvent contained in the liquid crystal coating 421 and simultaneously align the said liquid crystal coating 421 to the alignment layer. The aligned liquid crystal layer 421 is then conducted an embossing treatment via a grooved roller 630 as mentioned above, to form a plurality of relief structures and groove structures. The structures of the relief structures and the groove structures are then cured via curing means 450. The curing means is a UV-curing mean or a thermo-curing means. After curing treatment, the phase retardation of the relief structures and the groove structures are different by 180°. A patterned retarder film 451 is sequentially wounded on a second roller 460. In another embodiment of the method for manufacturing a patterned retarder film of the present invention, the patterned retarder film 451 can be laminated with a release film 471 which is rewound from a third roller 470. The release film 471 is in a direction to dispose on the patterned retarder film 451. The release film 471 and the patterned retarder film 451 are passed through a laminating means 480 and sequentially wound on a roller 490, as shown in FIG. 5

The present patterned retarder film manufactured by one embodiment of the present invention is utilized with at least one of functional optical films selected from a group consisting of hard-coating film, low reflective film, anti-reflective film and anti-glaring film on the surface of the base film opposed to the surface for forming the alignment layer in order to provide desired additional optical functionalities.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for manufacturing a patterned retarder film with a plurality of first retardation regions and a plurality of second retardation regions, comprising the steps of:
   providing a base film;
   forming an alignment layer on a first surface of the base film;
   coating a liquid crystal material on the alignment layer as a liquid crystal layer;
   aligning the liquid crystal layer with the alignment layer;
   embossing the liquid crystal layer with a predetermined pattern to form a patterned layer with a plurality of first retardation regions and a plurality of second retardation regions, wherein the structure of the first retardation regions and the second retardation regions are grating-like stripe structure and parallel to each other and the structure of the second retardation regions relative to that of the first retardation regions are grooving-like stripe structure and interleaved with each other; and
   curing the patterned liquid crystal layer;
   wherein the phase retardation of the first retardation region and that of the second retardation regions is different by 180°.

2. The method according to claim 1, wherein the phase retardation of the base film is substantial 0°.

3. The method according to claim 1, wherein the base film is selected from a group consisting of poly (ethylene terephthalate), polycarbonate, triacetyl cellulose, poly (methyl methacrylate) and cyclo-olefin polymer.

4. The method according to claim 1, wherein the thickness of the base film is in the range of 30 microns to 300 microns.

5. The method according to claim 1, wherein the alignment layer formed on the base film is formed by a process selected from the group consisting of micro-scratch alignment treatment, rubbing treatment, photo-alignment, SiO$_2$ evaporation and ion-beam alignment.

6. The method according to claim 1, wherein the thickness of the cured crystal liquid layer is in the range of 1 micron to 3 microns.

7. The method according to claim 1, wherein the step of aligning the liquid crystal layer with the alignment layer is conducted at the temperature in the range between about 50° C. to about 100° C.

8. The method according to claim 7, wherein the step of aligning the liquid crystal layer with the alignment layer is conducted at the temperature of about 70° C.

9. The method according to claim 1, wherein the patterned liquid crystal layer is cured by a curing treatment selected from a group consisting of a UV curing treatment and a thermal curing treatment.

10. The method according to claim 1, further comprising the step of adhering a polarizer film on the cured crystal liquid layer.

11. The method according to claim 1, further comprising the step of adhering at least one of functional optical films selected from a group consisting of hard-coating film, low reflective film, anti-reflective film and anti-glaring film on a second surface of the base film opposed to the first surface thereof.

12. A patterned retarder film with a plurality of first retardation regions and a plurality of second retardation regions, comprising:
   a base film;
   an alignment layer on a first surface of the base film;
   a liquid crystal layer coated on and aligned with the alignment layer; and
   a plurality of first retardation regions and a plurality of second retardation regions embossed on the liquid crystal layer with a predetermined pattern, wherein the structure of the first retardation regions and the second retardation regions are grating-like stripe structure and parallel to each other and the structure of the second retardation regions relative to that of the first retardation regions are grooving-like stripe structure and interleaved with each other;
   wherein the phase retardation of the first retardation region and that of the second retardation regions is different by 180°.

13. The patterned retarder film according to claim 12, wherein the phase retardation of the base film is less than 90°.

14. The patterned retarder film according to claim 13, wherein the phase retardation of the base film is substantial 0°.

15. The patterned retarder film according to claim 12, wherein the base film is selected from a group consisting of poly (ethylene terephthalate), polycarbonate, triacetyl cellulose, poly (methyl methacrylate) and cyclo-olefin polymer.

16. The patterned retarder film according to claim 12, wherein the thickness of the base film is in the range of 30 microns to 300 microns.

17. The patterned retarder film according to claim 12, wherein the alignment layer of the base film is formed by a process selected from the group consisting of micro-scratch alignment treatment, rubbing treatment, photo-alignment, SiO$_2$ evaporation and ion-beam alignment.

18. The patterned retarder film according to claim 12, wherein the thickness of the cured crystal liquid layer is in the range of 1 micron to 3 microns.

19. The method according to claim 12, further comprising the step of adhering a polarizer film on the cured crystal liquid layer.

20. The patterned retarder film according to claim 12, further comprising at least one of functional optical film adhered on a second surface of the base film opposed to the first surface thereof, wherein the functional optical film is selected from a group consisting of hard-coating film, low reflective film, anti-reflective film and anti-glaring film.

* * * * *